United States Patent
Prasad et al.

(10) Patent No.: US 11,568,464 B2
(45) Date of Patent: Jan. 31, 2023

(54) METHOD, NON-TRANSITORY COMPUTER-READABLE MEDIUM, AND SYSTEM FOR DETERMINING RECOMMENDED SEARCH TERMS FOR A USER OF AN ONLINE CONCIERGE SYSTEM

(71) Applicant: Maplebear, Inc., San Francisco, CA (US)

(72) Inventors: Shishir Kumar Prasad, Fremont, CA (US); Sharath Rao, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 16/815,846

(22) Filed: Mar. 11, 2020

(65) Prior Publication Data

US 2021/0287271 A1    Sep. 16, 2021

(51) Int. Cl.
*G06Q 30/06* (2012.01)
*G06F 16/953* (2019.01)

(52) U.S. Cl.
CPC ....... *G06Q 30/0625* (2013.01); *G06F 16/953* (2019.01)

(58) Field of Classification Search
CPC .......... G06Q 30/0601–0645; G06Q 30/06–08; G06Q 30/0623–0631; G06Q 30/0625–0629; G06F 16/953
USPC ................................. 705/26.1–27.2
See application file for complete search history.

(56) References Cited

U.S. PATENT DOCUMENTS

| | | | |
|---|---|---|---|
| 10,628,431 B2 * | 4/2020 | Chittar | G06F 16/24578 |
| 11,004,135 B1 * | 5/2021 | Sandler | G06Q 30/0631 |
| 11,151,608 B1 * | 10/2021 | Guo | G06Q 30/0631 |
| 2011/0093488 A1 * | 4/2011 | Amacker | G06F 16/3323 707/767 |
| 2016/0140125 A1 * | 5/2016 | Goyal | G06N 20/00 707/751 |
| 2017/0193586 A1 * | 7/2017 | Yuan | G06Q 30/0625 |
| 2019/0258722 A1 * | 8/2019 | Guo | G06N 3/0454 |
| 2020/0175360 A1 * | 6/2020 | Conti | G06V 10/776 |

OTHER PUBLICATIONS

Rowe, Kevin. "How Search Engines Use Machine Learning: 9 Things We Know for Sure" (2018) SearchEngineJournal.com (Year: 2018).*

(Continued)

*Primary Examiner* — Allison G Wood
*Assistant Examiner* — Katherine A Barlow
(74) *Attorney, Agent, or Firm* — Fenwick & West LLP

(57) ABSTRACT

An online concierge system may determine recommended search terms for a user. The online concierge system may receive a request from a user to view a user interface configured to receive a search query. The online concierge system retrieves long-term activity data including previous search terms entered by the user while searching for items to add to an online shopping cart. For each previous search term, the online concierge system retrieves categorical search terms corresponding to one or more categories to which the previous search term was mapped. The online concierge system determines a set of nearby categorical search terms and sends, for display via a client device, the set of nearby categorical search terms as recommended search terms.

20 Claims, 8 Drawing Sheets

(56) References Cited

OTHER PUBLICATIONS

Sullivan, Danny. "How Google Instant's Autocomplete Suggestions Work." SearchEngineLand.com (Year: 2011).*
Grbovic, Mihajlo et. al. "Real-time Personalization using Embeddings for Search Ranking at Airbnb" Association for Computing Machinery. KDD '18: Proceedings of the 24th ACM SIGKDD International Conference on Knowledge Discovery & Data Mining, pp. 311-320 (Year: 2018).*

* cited by examiner

METHOD, NON-TRANSITORY COMPUTER-READABLE MEDIUM, AND SYSTEM FOR DETERMINING RECOMMENDED SEARCH TERMS FOR A USER OF AN ONLINE CONCIERGE SYSTEM

BACKGROUND

This disclosure relates generally to recommending search terms in an online concierge system. More particularly, the disclosure relates to determining recommended search terms based on previous search terms a customer has used.

In current online systems and mobile applications, a customer creates a shopping list of items in an online shopping cart to be purchased from a retailer. To help facilitate the customer's search process as they add items to the shopping list, the online system or mobile application may recommend search terms to the customer based on popular items. However, this does not account for search terms related to the customer's activity on the online system, including what items they have purchased, and the online system may only show search terms that the customer has previously used. For example, even if a customer previously searched tofu, recommending searching tofu again may not be useful to the customer when the customer consistently searches for tofu when they shop. Therefore, a system for recommending search terms that are more relevant or related to the previous search terms used by the customer and items already on the shopping list is necessary to give customers better suggestions of what to search when creating an order.

SUMMARY

To determine recommended search terms for a customer, an online system analyzes items in the customer's online shopping cart. When a customer searches for items to add to the online shopping cart, the online system suggests recommended search terms to search based on the search terms the customer has previously used. The recommended search terms are based on categorical search terms in categories to which the previous search terms have been mapped. The online system determines a set of nearby categorical search terms, which may be determined by scoring the categorical search terms using embeddings for the categorical search terms and the previous search terms with a machine-learned model, and the online system determines a set of recommended search terms to display to the customer from the nearby categorical search terms.

More particularly, in some embodiments, the online system may determine recommended search terms for a user. The online system receives a request from a user to view a user interface configured to receive a search query. The online system retrieves long-term activity data including previous search terms entered by the user while searching for items to add to an online shopping cart. For each previous search term, the online system retrieves categorical search terms corresponding to one or more categories to which the previous search term was mapped. The online system determines a set of nearby categorical search terms and sends, for display via a client device, the set of nearby categorical search terms as recommended search terms. In some embodiments, the online system determines the nearby categorical search terms by retrieving embeddings describing the categorical search terms and the previous search terms, scoring the categorical search terms based on the embeddings using a machine-learned model, ranking the categorical search terms by score, and using the highest ranked categorical search terms as nearby categorical search terms.

In some embodiments, the online system may also score the categorical search terms based on embeddings for items currently in the online shopping cart, items previously ordered, and information describing the customer. However, using the previous search terms instead of just items to determine recommended search terms may be more indicative of what the customer is looking for while shopping in the context of a recipe (e.g., the customer just searched for pasta, so the online system will recommend they search for tomato sauce next). Further, using the items themselves may lead to a very sparse matrix with little overlap between items, whereas the categories related to the search terms are less sparse.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Environment of an Online Concierge System

Figure 1:
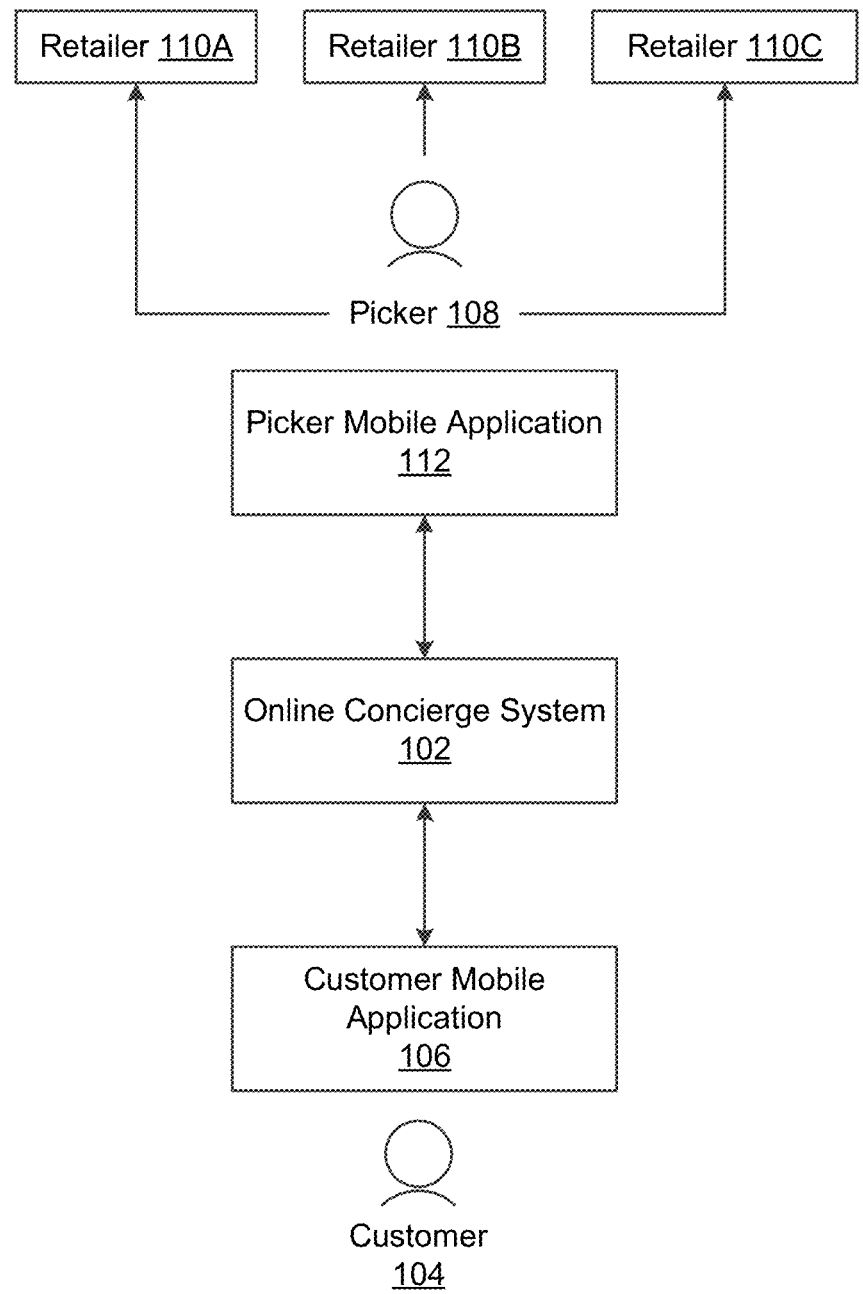
FIG. 1 illustrates the environment of an online concierge system, according to one embodiment.

FIG. 1 illustrates the environment 100 of an online concierge system 102, according to one embodiment. The figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral. For example, "110" in the text refers to reference numerals "110A" and/or "110B" in the figures. Further, reference to using an online concierge system 102 for this invention is made throughout this specification. However, in other embodiments, another online system or mobile application may be used to determine recommended search terms.

The environment 100 includes an online concierge system 102. The online concierge system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In some embodiments, the order specifies one or more retailers from which the selected items should be purchased. The customer 104 may use a customer mobile application (CMA) 106 to place the order; the CMA 106 is configured to communicate with the online concierge system 102.

The online concierge system 102 is configured to transmit orders received from customers 104 to one or more pickers 108. A picker 108 may be a contractor, employee, or other person (or entity) who is enabled to fulfill orders received by the online concierge system 102. The environment 100 also includes three retailers 110A, 110B, and 110C (only three are shown for the sake of simplicity; the environment could include hundreds of retailers). The retailers 110 may be physical retailers, such as grocery stores, discount stores, department stores, etc., or non-public warehouses storing items that can be collected and delivered to customers 104. Each picker 108 fulfills an order received from the online concierge system 102 at one or more retailers 110, delivers the order to the customer 104, or performs both fulfillment and delivery. In one embodiment, pickers 108 make use of a picker mobile application 112 which is configured to interact with the online concierge system 102.

Online Concierge System

Figure 2:
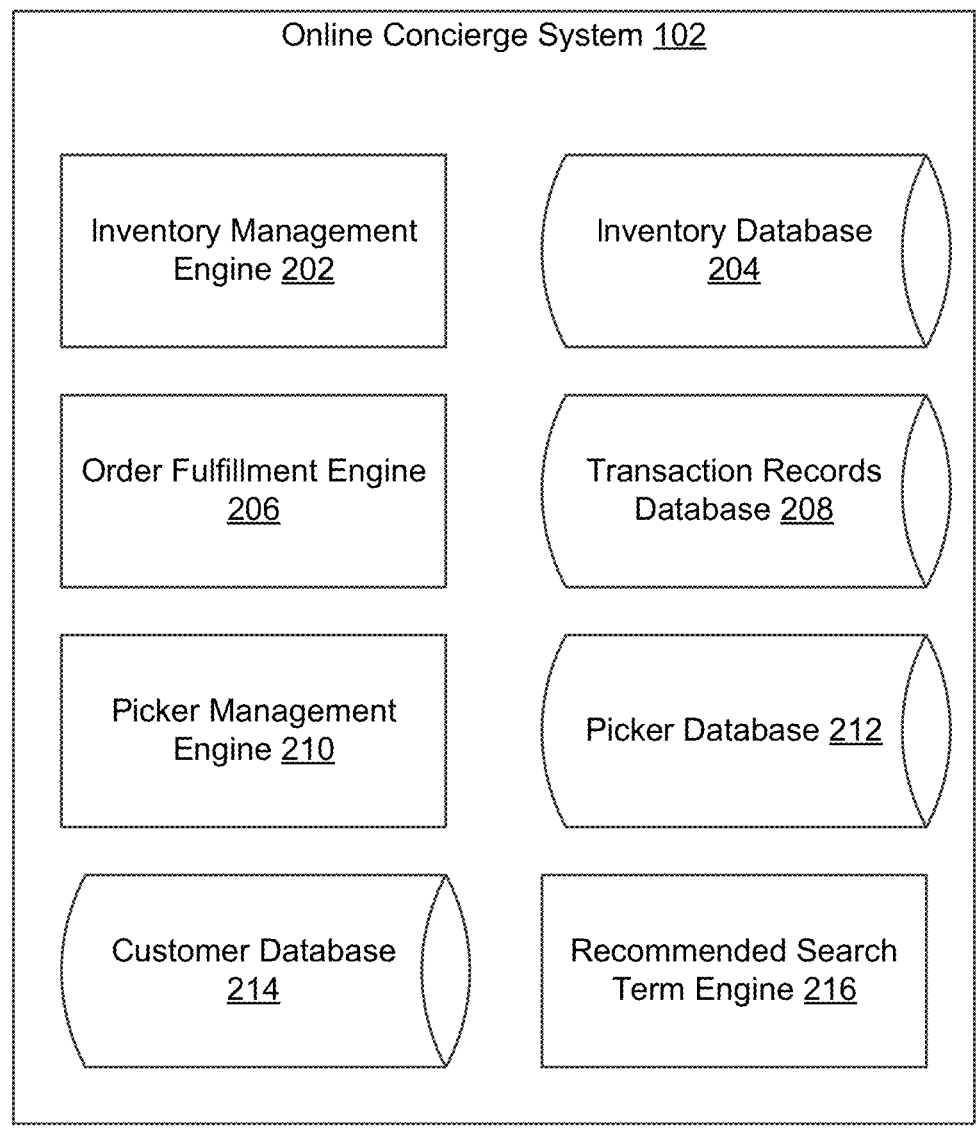
FIG. 2 is a block diagram of an online concierge system, according to one embodiment.

FIG. 2 is a block diagram of an online concierge system 102, according to one embodiment. The online concierge system 102 includes an inventory management engine 202, which interacts with inventory systems associated with each retailer 110. In one embodiment, the inventory management engine 202 requests and receives inventory information maintained by the retailer 110. The inventory of each retailer 110 is unique and may change over time. The inventory management engine 202 monitors changes in inventory for each participating retailer 110. The inventory management engine 202 is also configured to store inventory records in an inventory database 204. The inventory database 204 may store information in separate records—one for each participating retailer 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204.

The online concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which products are available at which retailers 110. The order fulfillment engine 206 determines a sale price for each item ordered by a customer 104. Prices set by the order fulfillment engine 206 may or may not be identical to in-store prices determined by retailers 110 (which is the price that customers 104 and pickers 108 would pay at retailers). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

The order fulfillment engine 206 also determines replacement options for items in an order. For each item in an order, the order fulfillment engine 206 may retrieve data describing items in previous orders facilitated by the online concierge system 102, previously selected replacement options for that item, and similar items. Similar items may be items of the same brand or type or of a different flavor. Based on this data, the order fulfillment engine 206 creates a set of replacement options for each item in the order comprising the items from the data. The order fulfillment engine 206 ranks replacement options in the set to determine which items to display to the customer 104. In some embodiments, the order fulfillment engine 206 may rank the replacement options by the number of previous orders containing the replacement option or user quality ratings gathered by the online concierge system 102. In some embodiments, the order fulfillment engine 206 only uses data for the customer 104 related to the order to suggest replacement options.

In some embodiments, the order fulfillment engine 206 also shares order details with retailer 110. For example, after successful fulfillment of an order, the order fulfillment engine 206 may transmit a summary of the order to the appropriate retailer 110. The summary may indicate the items purchased, the total value of the items, and in some cases, an identity of the picker 108 and customer 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a picker management engine 210, which manages communication with and utilization of pickers 108. In one embodiment, the picker management engine 210 receives a new order from the order fulfillment engine 206. The picker management engine 210 identifies the appropriate retailer 110 to fulfill the order based on one or more parameters, such as the contents of the order, the inventory of the retailers 110, and the proximity to the delivery location. The picker management engine 210 then identifies one or more appropriate pickers 108 to fulfill the order based on one or more parameters, such as the picker's proximity to the appropriate retailer 110 (and/or to the customer 104), his/her familiarity level with that particular retailer 110, and so on. Additionally, the picker management engine 210 accesses a picker database 212 which stores information describing each picker 108, such as his/her name, gender, rating, previous shopping history, and so on. The picker management engine 210 transmits the list of items in the order to the picker 108 via the picker mobile application 112. The picker database 212 may also store data describing the sequence in which the pickers 108 picked the items in their assigned orders.

As part of fulfilling an order, the order fulfillment engine 206 and/or picker management engine 210 may access a customer database 214 which stores information describing each customer 104. This information could include each customer's name, address, gender, shopping preferences, favorite items, stored payment instruments, and so on.

The online concierge system 102 also includes a recommended search term engine 216 to determine recommended search terms for a customer 104. In some embodiments, customer mobile application 106 includes the recommended search term engine 216. In these embodiments, the customer mobile application 106, instead of the online concierge system 102, uses the recommended search term engine 216 to determine recommended search terms for the customer 104. The recommended search term engine 216 is further described in relation to FIG. 4.

Figure 3A:
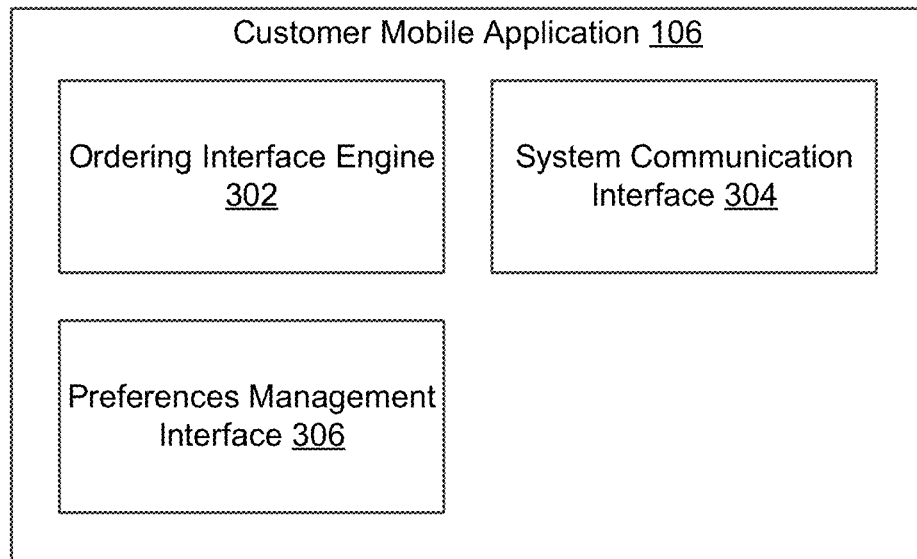
FIG. 3A is a block diagram of the customer mobile application (CMA), according to one embodiment.

FIG. 3A is a block diagram of the customer mobile application (CMA) 106, according to one embodiment. The customer 104 accesses the CMA 106 via a client device, such as a mobile phone, tablet, laptop, or desktop computer. The CMA 106 may be accessed through an app running on the client device or through a website accessed in a browser. The CMA 106 includes an ordering interface engine 302, which provides an interactive interface, known as a customer ordering interface, with which the customer 104 can enter search queries of search terms when looking for products, browse through products, select products to add to their online shopping cart, and place an order using various interactive elements.

Customers 104 may also use the customer ordering interface to message with pickers 108 and receive notifications regarding the status of their orders. Customers 104 may view their orders and communicate with pickers 108 regarding an issue with an item in an order using the customer ordering interface. Customers 104 may also view and select recommended search terms via the customer ordering interface. Recommended search terms are search terms the customer 104 is likely to use based on previous search terms they have used, previous items they have purchased, and their product preferences, and the online concierge system determines recommended search terms by analyzing the previous search terms, items purchased or currently added to the customer's online shopping cart, and other data describing the customer 104. For example, the order fulfillment engine 206 may determine, based on a previous search terms a customer 104 has used, that the customer 104 is likely to search "tomato," which is related to the previous search terms "basil" and "pasta." The process of determining recommended search terms is further described in relation to FIG. 4.

The CMA 106 also includes a system communication interface 304 which, among other functions, receives inventory information from the online concierge system 102 and transmits order information to the online concierge system 102. The CMA 106 also includes a preferences management interface 306 which allows the customer 104 to manage basic information associated with his/her account, such as his/her home address and payment instruments. The preferences management interface 306 may also allow the user to manage other details such as his/her favorite or preferred retailers 110, preferred delivery times, special instructions for delivery, and so on.

Figure 3B:
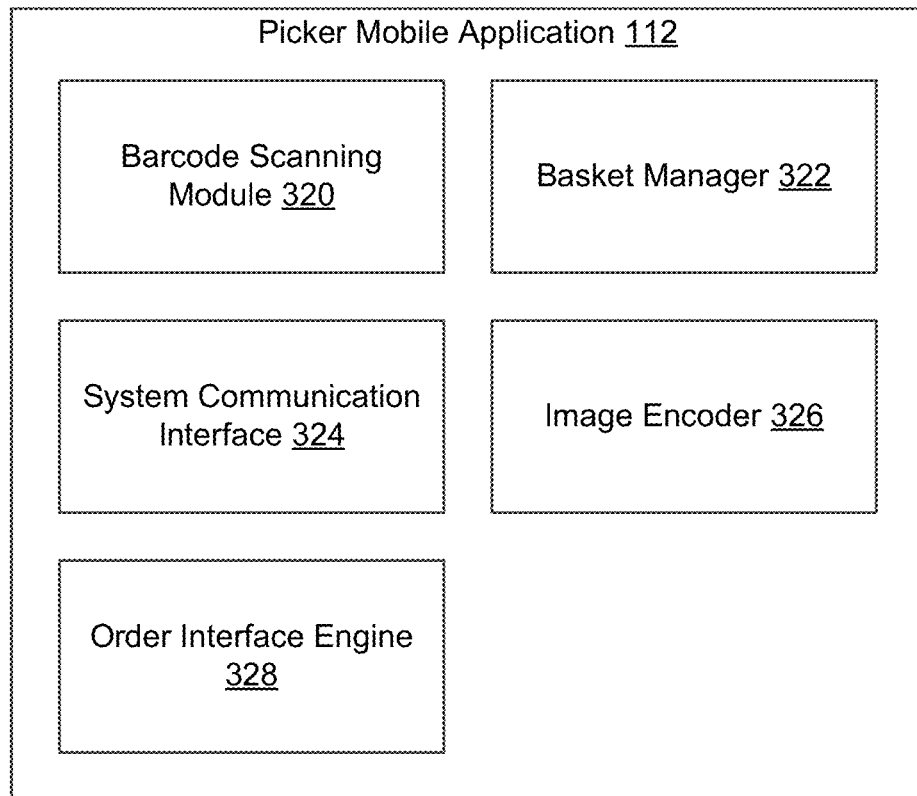
FIG. 3B is a block diagram of the picker mobile application (PMA), according to one embodiment.

FIG. 3B is a block diagram of the picker mobile application (PMA) 112, according to one embodiment. The picker 108 accesses the PMA 112 via a mobile client device, such as a mobile phone or tablet. The PMA 112 may be accessed through an app running on the mobile client device or through a website accessed in a browser. The PMA 112 includes a barcode scanning module 320 which allows a picker 108 to scan an item at a retailer 110 (such as a can of soup on the shelf at a grocery store). The barcode scanning module 320 may also include an interface which allows the picker 108 to manually enter information describing an item (such as its serial number, SKU, quantity and/or weight) if a barcode is not available to be scanned. The PMA 112 also includes a basket manager 322 which maintains a running record of items collected by the picker 108 for purchase at a retailer 110. This running record of items is commonly known as a "basket." In one embodiment, the barcode scanning module 320 transmits information describing each item (such as its cost, quantity, weight, etc.) to the basket manager 322, which updates its basket accordingly. The PMA 112 also includes an image encoder 326 which encodes the contents of a basket into an image. For example, the image encoder 326 may encode a basket of goods (with an identification of each item) into a QR code which can then be scanned by an employee of the retailer 110 at check-out.

The PMA 112 also includes a system communication interface 324, which interacts with the online concierge system 102. For example, the system communication interface 324 receives information from the online concierge system 102 about the items of an order, such as when a customer 104 updates an order to include more or fewer items. The system communication interface may receive notifications and messages from the online concierge system 102 indicating information about an order or communications from a customer 104. The system communication interface 324 may send this information to the order interface engine 328, which generates a picker order interface.

A picker order interface is an interactive interface through which pickers 108 may interact message with customers 104 and receive notifications regarding the status of orders they are assigned. Pickers 108 may view their orders through the picker order interface and indicate when there is an issue with an item in an order, such as the item being out of stock or of poor quality. A picker 108 may draft a message to a customer 104 associated with the order requesting clarification about what to do for the item given the issue. The picker order interface displays template messages for the picker 108 to choose from regarding the item and the picker 108 may edit the template message to include more information about the item or a question for the customer 104. The picker 108 communicate back and forth with the customer 104 until the issue is resolved.

Figure 4:
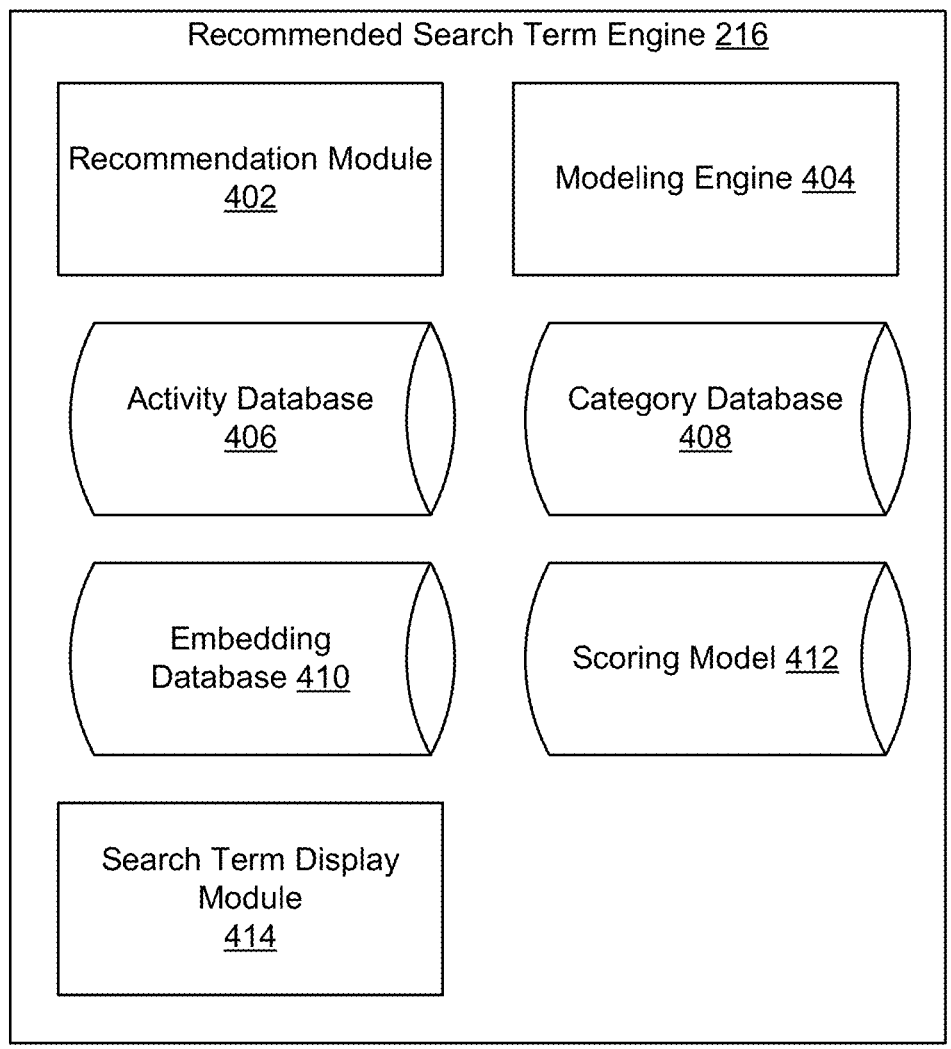
FIG. 4 is a block diagram of the recommended search term engine, according to one embodiment.

FIG. 4 is a block diagram of the recommended search term engine 216, according to one embodiment. The recommended search term engine 216 determines recommended search terms for a customer 104 and includes a recommendation module 402, a modeling engine 404, an activity database 406, a category database 408, an embedding database 410, a scoring model 412, and a search term display module 414. In some embodiments, the recommended search term engine 216 may employ other modules and databases not shown in FIG. 4.

The recommended search term engine 216 includes a recommendation module 402. The recommendation module 402 determines recommended search terms for a customer 104. Search terms are combinations of words and characters typed as a user input by a customer 104 in a customer ordering interface configured to receive a search query of search terms. Search terms may correspond to brand items offered by the online concierge system 102 or generic items (i.e., the generic version of an item). For example, a user may enter the search term "moo moo milk" or the search term "milk" when looking for the brand item "Moo Moo Organic Milk." Further, the customer 104 may select recommended search terms via the customer ordering interface. For example, when the customer 104 has typed "mi" in the customer ordering interface, the recommended search term engine 216 may determine and send the recommended search terms "milk," "mint," and "mini cookies" for display via the customer ordering interface. The customer ordering interface is further described in relation to FIG. 5.

The scoring module 408 may access and store long-term activity data for the customer 104 from the activity database 406. The long-term activity data includes previous search terms the customer 104 has used. The previous search terms are search terms entered as search queries by the customer via the customer ordering interface. For example, the customer 104 may have entered the search term "berries" when looking for raspberries to add to an order. The previous search terms may also include historical recommended search terms for the customer 104, which are recommended search terms that were previously presented to the customer 104. Further, the long-term activity data stored in the activity database 406 may include items ordered in previous orders and items in a current order in the customer's online shopping cart. In some embodiments, these items may be brand items sold at a retailer 110. In other embodiments, the items, both in the current and previous orders, are each stored in the activity database 406 as a generic item or generic search term, which describes a generic version of a particular item. For example, the items "Moo Moo Organic Milk," "Greener Pastures 2% Milk," and "Cow Bell Whole Milk" may correspond to the generic item (or generic search term) "milk."

The recommendation module 402 retrieves a set of search terms from the category database 408 corresponding to the previous search terms. The category database 408 stores an index of search terms grouped into categories based on similar characteristics. For example, the search terms "rice" and "*Quinoa*" are in the categories "grains" and "carbs," among other categories. In some embodiments, each category may be associated with subcategories further segmenting the search terms in the category by defining characteristics. For example, the category "fruits" may include the subcategories "berries," "stone fruits," and "seedless fruits." Further, the categories (and subcategories) may be stored in the category database 408 with similarity measures that indicate how similar or related the category is to each other category. For example, the category "chips" may be closely related to the category "dips" since chips are often eaten with dips. In this example, the category database 408 may store a similarity measure between the categories indicating the strength of the relationship between "chips" and "dips," which may be indicate by a percentage (e.g., 83%). In another example, the category "taco ingredients" may have a higher similarity measure with the category "Mexican food" than with the category "Greek food."

For each previous search term, the recommendation module 402 determines one or more categories that include the previous search term and retrieves a set of the other search terms (known as categorical search terms) in those categories from the category database 408. In some embodiments, the recommendation module 402 also retrieves the categorical search terms in categories with a threshold similarity measure to the categories including the previous search term. For example, the recommendation module 402 may retrieve all of the categorical search terms in the category "bread" for the previous search term "bagel" along with all of the categorical search terms in the category "spreads," which does not include "bagel" but has a similarity measure of 76% to "bread." The recommendation module 402 only retrieves one instance of each categorical search term. For example, the search term "carrot" may be associated with the categories "vegetable," "root," and "produce," and though "potato and "onion" are also in those 3 categories, the recommendation module 402 only adds both "potato" and "onion" to the set of categorical search terms once.

The recommendation module 402 uses a machine-learned scoring model 412 to score the categorical search terms. The scoring model 412 is a predictive model that generates a score for each categorical search term, given the previous search terms and, in some embodiments, items in a current order and the customer 104. Additional inputs to the scoring model 412 can be used, e.g., time of day, day of week, and items previously ordered by the customer 104. The predictive model may score the categorical search terms to predict the likelihood of the customer 104 picking each categorical search term when presented in the customer ordering interface. The scoring model 412 may be a neural network trained on historical recommended search terms sent to customers 104 of the online concierge system 102.

After the scoring model 412 scores each categorical search term, the recommendation module 402 ranks the categorical search terms based on the scores to determine a set of nearby categorical search terms. Nearby categorical search terms are categorical search terms that are most similar or related to the previous search terms (i.e., the categorical search terms the customer is most likely to pick). The nearby categorical search terms may be the categorical search terms with a score above a threshold level or a top percentage of the ranked categorical search terms (i.e., the categorical search terms within a threshold measure of similarity from the previous search terms). The recommendation module 402 and transmits the nearby categorical search terms in a ranked list to the customer 104 as recommended search terms in the customer ordering interface. In some embodiments, while a customer 104 is typing a search term into the customer ordering interface, the recommendation module 402 can determine, using the machine-learned scoring model 412, recommended search terms based on a user input typed by the customer 104 and sends to recommended search terms to the search term display module 414 for display to the customer 104 in real-time. The recommendation module may store the customer's selection of the recommended search terms in the activity database 406.

In some embodiments, the recommendation module 402 stores the categorical search terms and previous search terms in a hierarchical taxonomy in an optional nearby database based on the scores. For example, a categorical search term with a higher score will be stored closer to a related previous search term in the hierarchical taxonomy than a categorical search term with a lower score. The categorical search terms that are within a threshold distance of a previous search term in the hierarchical taxonomy are considered nearby categorical search terms for that previous search term. Once the recommendation module 402 has used the scoring model 412 to score the categorical search terms for a customer 104, the recommendation module 402 may retrieve nearby categorical search terms from the nearby database instead of generating new scores for the categorical search terms every time the customer 104 enters a new search term. The recommendation module 402 may rescore and update the hierarchical taxonomy periodically either based on a threshold amount of time passing or after the customer 104 enters a threshold amount of new search terms.

The recommendation module 402 may retrieve machine-learned embeddings for the categorical search terms from the embedding database 410 and use the embeddings as inputs to the machine-learned scoring model 412. Embeddings are used to describe entities, such as search terms, items, and customers 104, in a latent space. As used herein, latent space is a vector space where each dimension or axis of the vector space is a latent or inferred characteristic of the objects (e.g., search terms, items, and customers 104) in the space. Latent characteristics are characteristics that are not observed, but are rather inferred through a mathematical model from other variables that can be observed by the relationship of between objects (e.g., users or content items) in the latent space. Advantageously, all of the objects can be described in the same latent space, e.g., using a shared layer. Search terms, items, and customers 104 are generally described using different sets of latent characteristics. Using embeddings allows for faster processing of the relationships between the objects than with conventional matrices, which are very large and very sparse compared to the embeddings and cannot be processed in the same way with conventional computers.

For example, the search terms, items, and customers 104 can all be described using a ten-dimensional vector (i.e., a vector of length 10). All of the search terms, which can number in at least the millions, can be described in the same 10-dimension space. All of the items, which can number in at least the millions, can be described in a different 10-dimensional space. All of the customers, which can number in at least the millions, can be described in a third 10-dimensional space. If one million search terms are each described by ten parameters, the total number of parameters in the search term embeddings will be ten million. A smaller number of parameters may be used for the customers 104, e.g., ten thousand and one hundred thousand, respectively. In other embodiments, fewer or more dimensions are used to describe one or more of the search terms, items, and customers 104.

The machine-learned embeddings in the embedding database 410 and the machine-learned scoring model 412 can both be trained using a modeling engine 404. The modeling engine 404 receives data describing historical recommended search terms and trains the machine-learned scoring model 412 and machine-learned embeddings based on the received data. In some embodiments, the modeling engine 404 trains one machine-learned scoring model 412 for each customer 104 based on that customer's historical recommended search terms. In other embodiments, the recommended search term engine 216 has multiple modeling engines, e.g., one modeling engine for training the scoring model 412, and a second modeling engine for training the embeddings. The modeling engine 404 may also update the embeddings and the scoring model 412 after receiving additional data describing used search terms.

The trained search term embeddings reflect the characteristics and categories of the previous search terms. Items that have similar characteristics or that are in the same categories have similar embeddings. For example, "salmon" and "shrimp" may have similar embeddings because they are both in the categories "seafood" and "protein." However, "shrimp" and "lobster" may have even more similar embeddings since they are both in the category "shellfish," which "salmon" is not in. In some embodiments, some categories may be closely related to one another, which may be reflected in the embeddings. For example, the search term "chips" may be in the category "snacks," which is closely related to the category "dips." Even if the search term "salsa" is not the category "snacks," "salsa" may have a similar embedding to "chips" since salsa in the category "dips."

The embeddings for the customer 104 may reflect user preference information for the customer 104. The user preference information may include dietary restrictions the customer 104 follows (e.g., a vegetarian diet or allergic to peanuts), items the customer 104 does not like (e.g., pickles), and items the customer 104 is partial to (e.g., prefers turkey over ground beef). The user preference information may be inferred based on items the customer 104 previously purchased or searched for, as reflected by the long-term activity data, or may be entered by the customer via the customer ordering interface. For example, if a first customer 104 never orders meat, fish, or dairy products, and a second customer consistently orders meat, fish, or dairy products, this difference in ordered items may cause the modeling engine 404 to learn different embeddings for the two customers 104. Further, the embeddings for the customers 104 may reflect the customers' habits as they search for items to add to their online shopping cart. For example, if one customer 104 typically adds produce items to their order first, while another picker typically adds bakery items first, the modeling engine 404 may learn different embeddings for these customers 104.

The search term display model 414 generates a customer ordering interface that displays the recommended search terms in the CMA 106. The search term display model 414 receives the recommended search terms from the recommendation module 402 and selects a subset of the recommended search terms for display based on the dimensions of the client device associated with the customer's 104 account on the CMA 106. In some embodiments, the search term display model 414 displays similar previous search terms with each recommended item to show the customer 104 why the recommended search term was chosen. The search term display model 414 may also generate widgets and buttons that the customer 104 may interact with to select a recommended search term to search.

Customer Ordering Interface

Figure 5A:
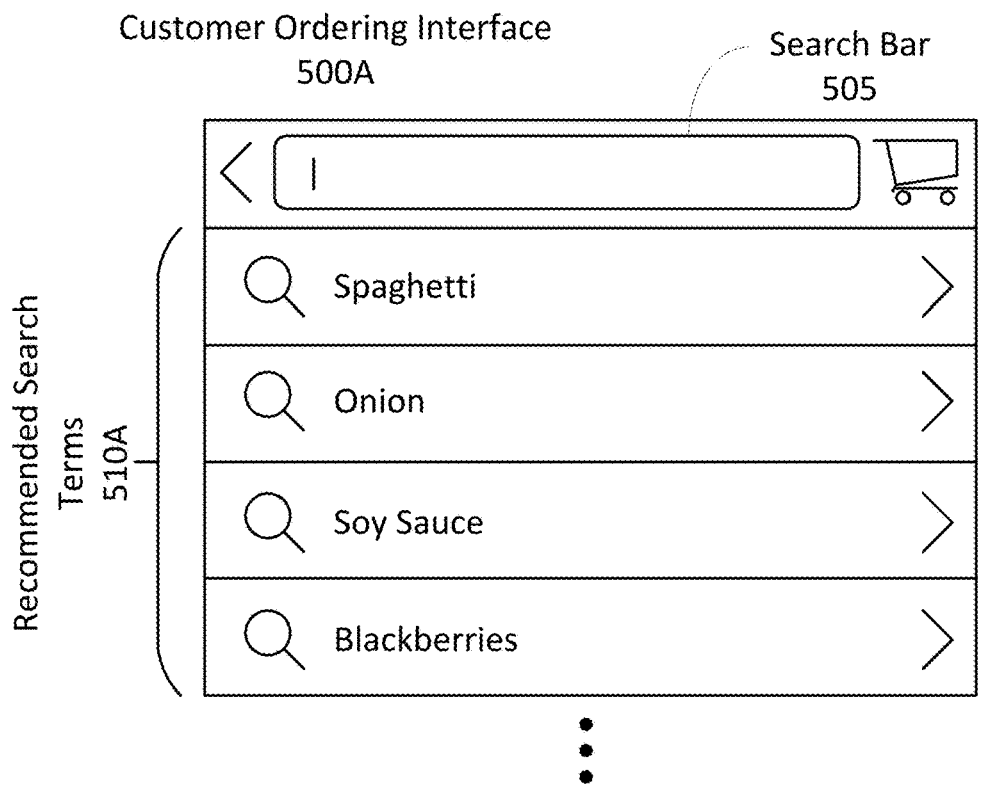
FIG. 5 is an example of a customer order interface displaying recommended search terms, according to one embodiment.
Figure 5B:
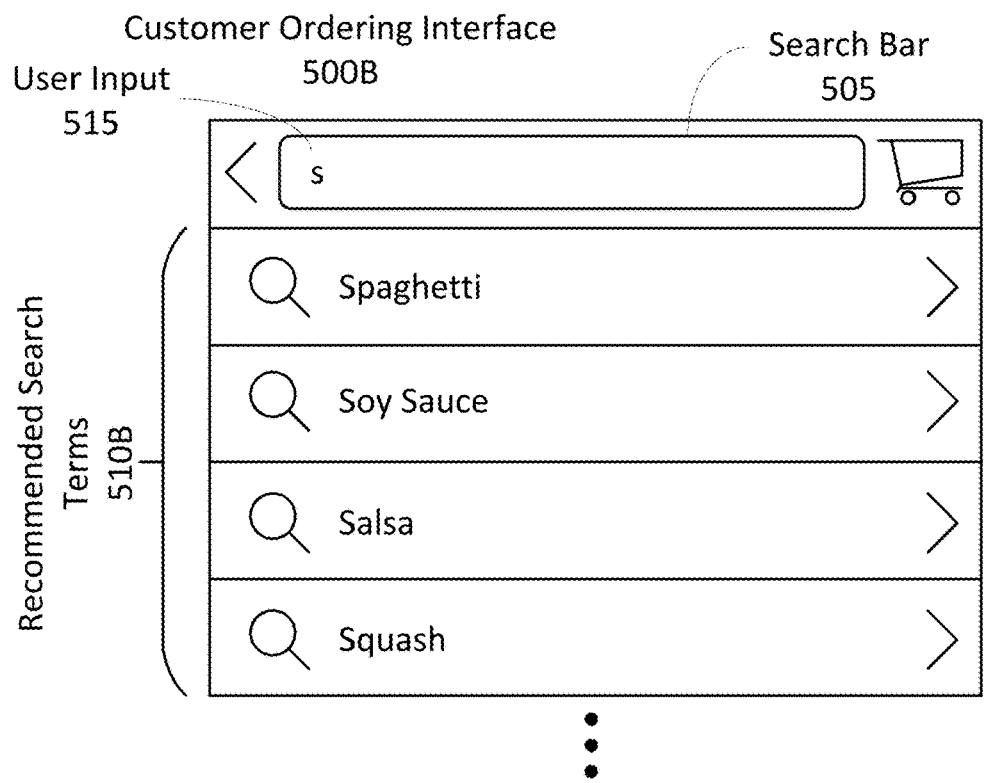

FIGS. 5A-5B are examples of a customer ordering interface displaying recommended search terms, according to one embodiment. In this embodiment, the customer ordering interface 500 includes a search bar 505 for a customer to type (or otherwise insert) characters into in order to search for items while creating an order. In other embodiments, the search bar is any other interactive element or widget that allows the customer 104 to perform a search query. The customer 104 may execute the search query by typing a search term in the user interface or by selecting a recommended search term 510.

In FIG. 5A, the customer ordering interface 500A displays a set of recommended search terms 510 generated by the recommended search term engine 216. The recommended search terms 510 may be displayed in a scrollable list. As the customer 104 types characters in the search bar 505, the customer ordering interface may update the set of displayed recommended search terms 510 to correspond to a user input 515 typed in the search bar, as shown in FIG. 5B. In particular, when the customer 104 types "s," the customer ordering interface 500B displays an updated set of recommended search terms 510B that search start with an "s." Though in this embodiment, the characters typed by the customer 104 match the beginning of each recommended search term 510B, in other embodiments, the characters may match other portions of the recommended search terms, such as the middle or end of the recommended search term.

Predictive Model for Determining Recommended Search Terms

Figure 6:
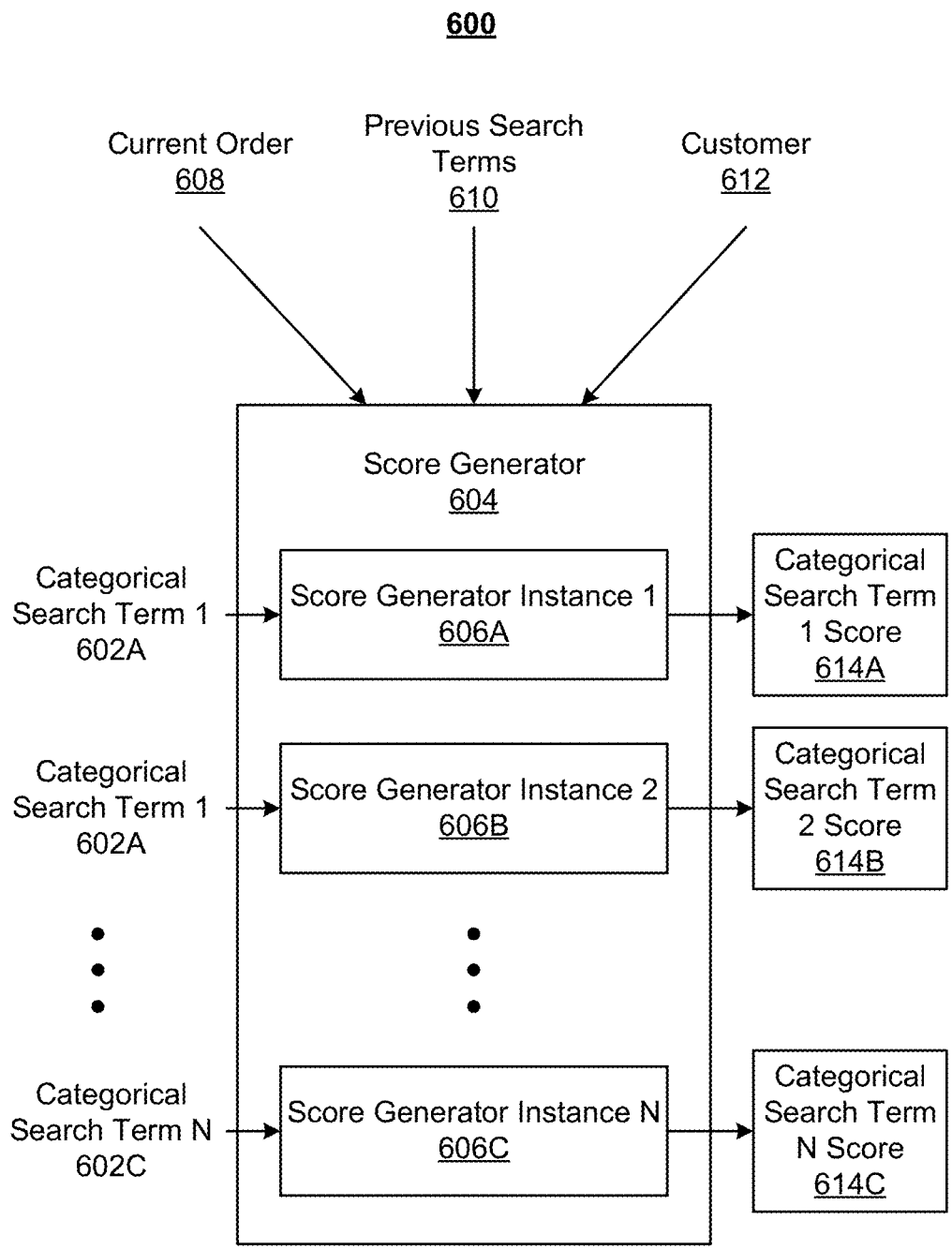
FIG. 6 is a block diagram of a process for determining recommended search terms using a machine learned model, according to one embodiment.

FIG. 6 is a block diagram of a process for scoring categorical search terms using a machine-learned model, according to one embodiment. The process 600 is performed by the recommended search term engine 216. The process 600 receives as an input a list of N categorical search terms 602, which includes categorical search term 1 602A through categorical search term N 602C. In some embodiments, the process 600 also receives as inputs information identifying the current order 608 (e.g., items currently in the customer's online shopping cart), previous search terms 610 (e.g., search terms previously entered by the customer 612 via the customer ordering interface 500), and the customer 612. The inputs 608-612 may be embeddings describing generic items in the current order 608, the previous search terms 610, and the customer 612, or the process 600 may involve retrieving embeddings describing generic items in the current order 608, the previous search terms 610, and the customer 612 from the embedding database based on the inputs 608-612.

The data for the categorical search terms 602A-602C, the current order 608, the previous search terms 610, and the customer 612 is input into a score generator 604, which calculates a categorical search term score 614 for each categorical search term 602. In some embodiments, the score generator 604 receives one or more additional inputs, such as generic items ordered in previous orders. The score generator 604 uses the machine-learned scoring model 412 to calculate the categorical search term scores 614A-614C. In particular, the score generator 604 executes multiple score generator instances 606A-606C, each of which utilizes the same machine-learned scoring model 412, to calculate each categorical search term score 614. Each score generator instance 606 calculates a categorical search term score 614 for a unique categorical search term 602; for example, score generator instance 1 606A calculates the categorical search term 1 score 614A for categorical search term 1 602A. An identical score generator 606 is used to score all of the categorical search terms 602A-602C. The details of one score generator instance 606 are shown in FIG. 7.

To score categorical search terms without any previous search terms from the customer 612, a slightly modified version of the process 600 can be used. A top percentage of previous search terms used by other customers 104 of the online concierge system 102 are input into the score generator as the previous search terms 602. The recommendation module 402 retrieves categorical search terms related to these previous search terms and selects a subset of the categorical search terms as recommended search terms based on scoring from the score generator 604 until the customer 612 has entered one or more search terms into (or selected a recommended search term from) the customer ordering interface 500.

Figure 7:
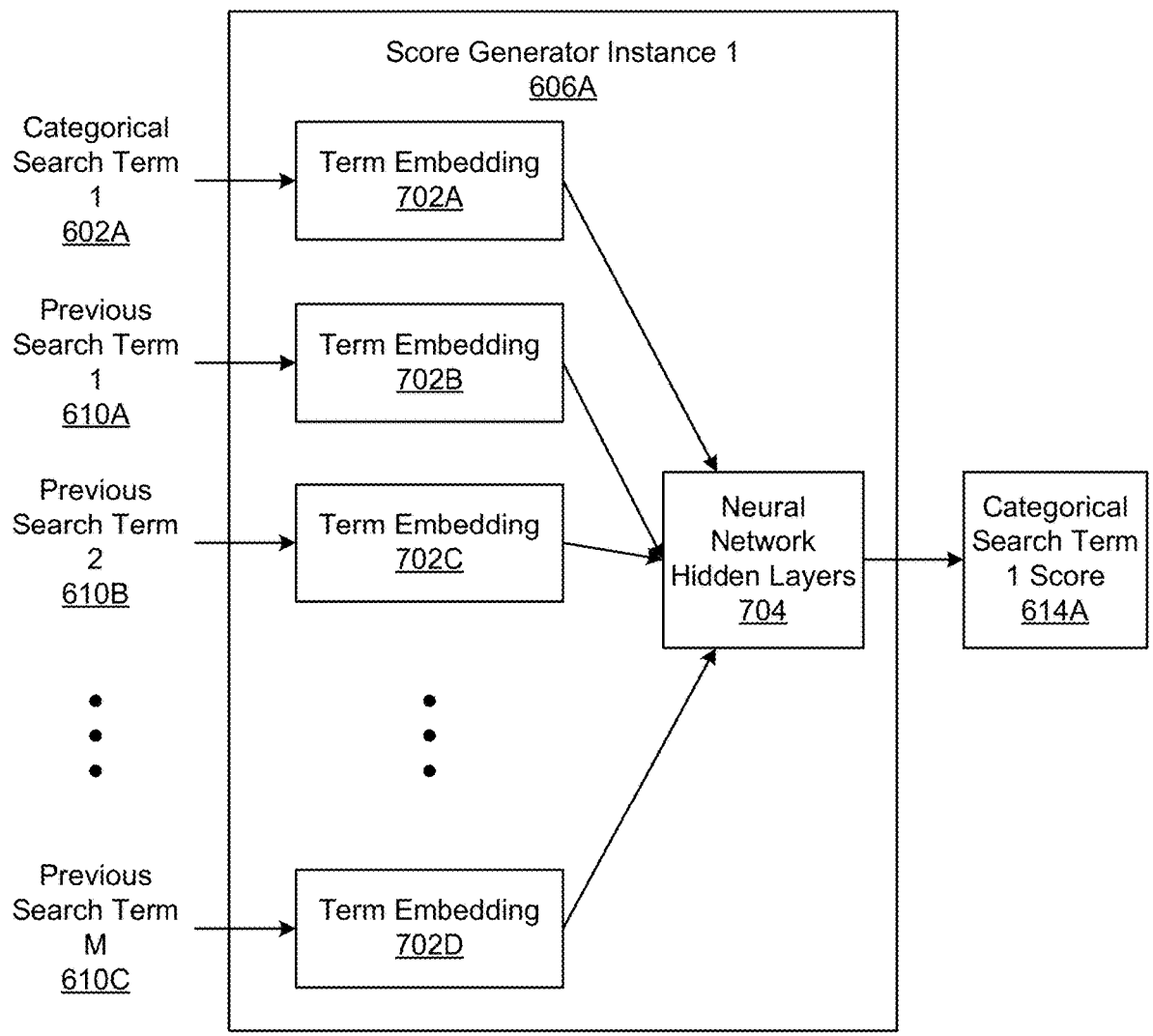
FIG. 7 is a block diagram showing the score generator used in the process shown in FIG. 6, according to one embodiment.

FIG. 7 is a block diagram showing the score generator used in the process shown in FIG. 6, according to one embodiment. In this example, the block diagram 700 shows score generator instance 1 606A, which calculates the categorical search term 1 score 614A for categorical search term 1 602A. Score generator instance 1 606A receives as inputs identifiers for categorical search term 1 602A and each of a list of M previous search terms 610, which include previous search term 1 610A through previous search term M 610C. For example, if categorical search term 1 602A is "salmon," score generator instance 1 606A retrieves a term embedding 702A describing categorical search term 1 602A from the embedding database 410. The score generator instance 1 606A similarly retrieves previous search term embeddings 702B-702D for the previous search terms 610A-610C searched for by the customer 612. In further embodiments, score generator instance 1 606A retrieves embeddings for generic items in a current order 608 and a customer embedding describing the customer 612.

The embeddings 702A-702D are input to a set of neural network hidden layers 704. In an embodiment with only three previous search terms 610, the embeddings 702A-702D (e.g., four 10-dimensional vectors) are first merged together to form a single vector (e.g., a single 40-dimensional vector), which is input to the neural network hidden layers 704. Although the number of parameters describing the embeddings is large (e.g., over 10 million, as described above), the total vector size being operated on within each score generator instance 606 is relatively small. The neural network hidden layers 708 are an example of the machine-learned scoring model 412. As described with respect to FIG. 4, the neural network hidden layers 708 are trained on data describing previous search terms.

The output of the neural network hidden layers 708 is the categorical search term 1 score 614A, which reflects the similarity of categorical search term 1 602A to the previous search terms 610. The recommendation module 402 compares the categorical search term score 614A for categorical search term 1 602A to other scores 614B-614C for the other categorical search terms 602 to determine, of all of the categorical search term, which categorical search terms to display to the customer 612. If the customer 612 is used as an input to the score generator 604, the neural network hidden layers 708 output the probability that the customer 612 would choose a categorical search term 602 if presented as a recommended search term.

Processes for Determining Recommended Search Terms

Figure 8:
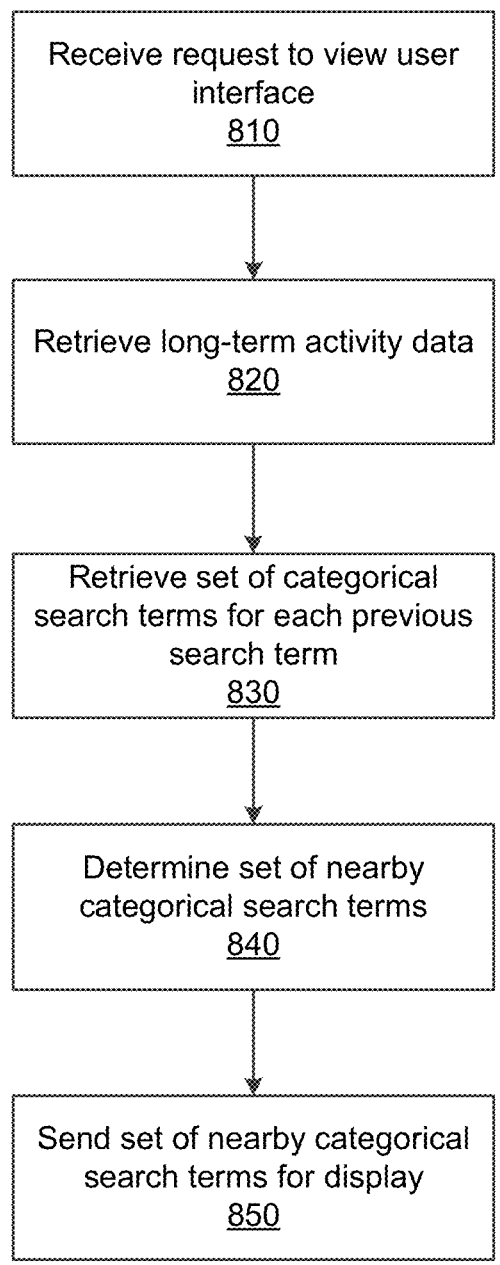
FIG. 8 is a flowchart illustrating a process determining recommended search terms for display, according to one embodiment.

FIG. 8 is a flowchart illustrating a process 800 determining recommended search terms for display, according to one embodiment. For simplicity, the following description of the process 800 is described in relation to the online concierge system 102, but this process 800 may also be carried out by the CMA 106 or a combination of the online concierge system 102 and the CMA 106. The online concierge system receives 810 a request from the CMA 106 by a user of a client device to view a user interface (e.g., the customer ordering interface) to search for items. The user interface is configured to receive a search query using an interactive element or widget, such as a search bar that the customer 104 can type characters and words into.

The online concierge system 102 retrieves 820 long-term activity data from the activity database 406. The long-term activity data includes previous search terms the user has entered in search queries in the online concierge system 102. In some embodiments, the long-term activity data also includes items previously ordered by the user and/or items currently in the user's online shopping cart on the online concierge system 102. For each previous search term, the online concierge system 102 retrieves 830 a set of categorical search terms corresponding to one or more categories the previous search term was mapped to in the category database 408. For example, the previous search term "chocolate" may map to the categories "candy" and "dessert," which each include categorical search terms related to candy and desserts (e.g., "lollipop" and "ice cream").

The online concierge system 102 determines 840 a set of nearby categorical search terms. In some embodiments, the online concierge system 102 determines the set of nearby categorical search terms based on scores for the categorical search terms. Further, the scores for the categorical search terms may be based on the previous search terms, items the user has previously ordered, items in the user's online shopping cart, and user preference information. The online concierge system 102 sends 850 the set of nearby categorical search terms for display on the client device as recommended search terms for the user. In some embodiments, the online concierge system modifies the set of nearby categorical search terms in response to receiving a user input to the user interface.

It is appreciated that although FIG. 8 illustrates a number of interactions according to one embodiment, the precise interactions and/or order of interactions may vary in different embodiments. For example, in some embodiments, the online concierge system 102 retrieves an embedding describing each previous search term in the long-term activity data and an embedding describing each retrieved categorical search term. In some embodiments, the online concierge system 102 determines the set of nearby categorical search terms by scoring each categorical search term. In some embodiments, the online concierge system 102 scores the categorical search terms using a machine-learned model (i.e., scoring model 412) trained on previously used search terms. The scoring for each categorical search term is further based on an embedding for the categorical search term and embeddings of each of the previous search terms. Using the scores, the online concierge system 102 determines a ranked list of the categorical search terms and sends a set of the highest ranked categorical search terms in the ranked list for display via the user interface.

In further embodiments, the online concierge system 102 inputs the previous search terms and the categorical search terms to the machine-learned model (e.g., the scoring model 412) and receives a score for each categorical search term from the machine-learned model. To train the machine-learned model, the online concierge system 102 retrieves, from the activity database 406, historical recommended search terms for the user and matches each historical recommended search term to categories in the category database 408. The online concierge system cross references the categorical search terms in those categories with previous search terms the user has entered to determine a set of previous search terms for each historical recommended search term. The online concierge system labels each historical recommended search term with the previous search terms in the corresponding set and the categorical search terms in the corresponding categories and trains the machine-learned model based on the labelled historical recommended search terms.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for improving a query engine, the method comprising:
   maintaining an embedding database that comprises a plurality of embeddings, the plurality of embeddings comprising a plurality of search-term embeddings and a plurality of categorical-search-term embeddings, each search-term embedding representing a search term in a latent space having at least ten dimensions and each categorical-search-term embedding representing a categorical search term in the latent space, wherein search terms and categorical search terms are arranged in a hierarchical taxonomy where a particular categorical search term includes a set of search terms, wherein the plurality of embeddings are generated by a first machine-learned model to reflect, for each search-term embedding, characteristics of items belonging to the search term and user preferences, and wherein the plurality of embeddings are generated by the first machine-learned model to have at least ten dimensions;
   receiving, from a client device, a request to view a user interface, the user interface configured to receive a search query for the query engine;
   retrieving historical activity data including previous search terms entered by a user of the client device in an online concierge system;
   identifying a set of candidate categorical search terms corresponding to the previous search terms in the historical activity data according to the hierarchical taxonomy maintained by the embedding database;
   receiving, via the user interface, a list of items selected by the user through the query engine; and
   generating, by the query engine, one or more suggestions of categorical search terms to be displayed at the user interface, wherein generating the one or more suggestions comprises:
      mapping the list of items selected by the user to a list of current search terms;
      retrieving the search-term embeddings representing the current search terms;
      retrieving the categorical-search-term embeddings representing the candidate categorical search terms identified from the previous search terms in the historical activity data;
      inputting the search-term embeddings and the categorical-search-term embeddings to a second machine-learned scoring model to generate a score for each candidate categorical search term, the second machine-learned scoring model trained to score the categorical-search-term embeddings based on similarities among the search-term embeddings and the categorical-search-term embeddings in the latent space;
      selecting one or more candidate categorical search terms as the one or more suggestions of categorical search terms to be displayed at the user interface; and
      sending, for display via the client device, one or more suggestions of categorical search terms as dynamic suggestions by the query engine.

2. The method of claim 1, further comprising:
   retrieving, for each previous search term in the historical activity data, an previous-search-term embedding describing the previous search term, wherein the previous-search-term embedding representing the previous search term in the latent space; and
   wherein generating the one or more suggestions is further is based on the previous-search-term embeddings.

3. The method of claim 2, wherein generating the one or more suggestions further comprises:
   determining a ranked list of candidate categorical search terms based on the score for each candidate categorical search term; and
   selecting a set of the highest ranked candidate categorical search terms in the ranked list.

4. The method of claim 1, further comprising:
   receiving, from the second machine-learned scoring model, the score for each candidate categorical search term.

5. The method of claim 4, further comprising:
   retrieving, from a database, historical recommended search terms for the user;
   determining, for each historical recommended search term, a set of previous search terms corresponding to the historical recommended search term, each previous search term associated with a set of categorical search terms;
   labelling each historical recommended search term as corresponding to one or more of the previous search terms based on the categorical search terms; and
   training the second machine-learned scoring model using the labelled historical recommended search terms.

6. The method of claim 5, wherein the second machine-learned scoring model is trained based on user preferences that include dietary restrictions the user follows and items the user is partial to and the characteristics of previous search terms are used to map previous search terms to the set of categorical search terms.

7. The method of claim 1, wherein generating the one or more suggestions is further based on generic items corresponding to the list of items currently in an online shopping cart of the user.

8. The method of claim 1, further comprising:
   responsive to receiving user input to the user interface:
      modifying the candidate categorical search terms to correspond to the user input; and
      sending, for display via the client device, the one or more suggestions.

9. A non-transitory computer-readable storage medium comprising instructions for improving a query engine, wherein the instructions, when executed by a processor, cause the processor to perform steps comprising:
   maintaining an embedding database that comprises a plurality of embeddings, the plurality of embeddings comprising a plurality of search-term embeddings and a plurality of categorical-search-term embeddings, each search-term embedding representing a search term in a latent space having at least ten dimensions and each categorical-search-term embedding representing a categorical search term in the latent space, wherein search terms and categorical search terms are arranged in a hierarchical taxonomy where a particular categorical search term includes a set of search terms, wherein the plurality of embeddings are generated by a first machine-learned model to reflect, for each search-term embedding, characteristics of items belonging to the search term and user preferences, and wherein the plurality of embeddings are generated by the first machine-learned model to have at least ten dimensions;

receiving, from a client device, a request to view a user interface, the user interface configured to receive a search query for the query engine;

retrieving historical activity data including previous search terms entered by a user of the client device in an online concierge system;

identifying a set of candidate categorical search terms corresponding to the previous search terms in the historical activity data according to the hierarchical taxonomy maintained by the embedding database;

receiving, via the user interface, a list of items selected by the user through the query engine; and generating, by the query engine, one or more suggestions of categorical search terms to be displayed at the user interface, wherein generating the one or more suggestions comprises:

mapping the list of items selected by the user to a list of current search terms;

retrieving the search-term embeddings representing the current search terms;

retrieving the categorical-search-term embeddings representing the candidate categorical search terms identified from the previous search terms in the historical activity data;

inputting the search-term embeddings and the categorical-search-term embeddings to a second machine-learned scoring model to generate a score for each candidate categorical search term, the second machine-learned scoring model trained to score the categorical-search-term embeddings based on similarities among the search-term embeddings and the categorical-search-term embeddings in the latent space;

selecting one or more candidate categorical search terms as the one or more suggestions of categorical search terms to be displayed at the user interface; and sending, for display via the client device, one or more suggestions of categorical search terms as dynamic suggestions by the query engine.

10. The non-transitory computer-readable storage medium of claim 9, the steps further comprising:

retrieving, for each previous search term in the historical activity data, an previous-search-term embedding describing the previous search term, wherein the previous-search-term embedding representing the previous search term in the latent space; and wherein generating the one or more suggestions is further based on the previous-search-term embeddings.

11. The non-transitory computer-readable storage medium of claim 10, wherein generating the one or more suggestions further comprise:

determining a ranked list of candidate categorical search terms based on the score for each candidate categorical search term; and selecting a set of the highest ranked candidate categorical search terms in the ranked list.

12. The non-transitory computer-readable storage medium of claim 9, wherein the steps further comprise:

receiving, from the second machine-learned scoring model, the score for each candidate categorical search term.

13. The non-transitory computer-readable storage medium of claim 12, the instructions further comprising:

retrieving, from a database, historical recommended search terms for the user;

determining, for each historical recommended search term, a set of previous search terms corresponding to the historical recommended search term, each previous search term associated with a set of categorical search terms;

labelling each historical recommended search term as corresponding to one or more of the previous search terms based on the categorical search terms; and training the second machine-learned scoring model using the labelled historical recommended search terms.

14. The non-transitory computer-readable storage medium of claim 9, wherein the second machine-learned scoring model is trained based on the user preferences that include dietary restrictions the user follows and items the user is partial to and the characteristics of previous search terms are used to map previous search terms to the set of categorical search terms.

15. The non-transitory computer-readable storage medium of claim 9, wherein generating the one or more suggestions is further based on generic items corresponding to the list of items currently in an online shopping cart of the user.

16. The non-transitory computer-readable storage medium of claim 9, the steps further comprising:

responsive to receiving user input to the user interface:
modifying the candidate categorical search terms to correspond to the user input; and sending, for display via the client device, the one or more suggestions.

17. A computer system comprising:
a computer processor; and
a non-transitory computer-readable storage medium storage instructions for improving a query engine, wherein the instructions when executed by the computer processor perform actions comprising:

maintaining an embedding database that comprises a plurality of embeddings, the plurality of embeddings comprising a plurality of search-term embeddings and a plurality of categorical-search-term embeddings, each search-term embedding representing a search term in a latent space having at least ten dimensions and each categorical-search-term embedding representing a categorical search term in the latent space, wherein search terms and categorical search terms are arranged in a hierarchical taxonomy where a particular categorical search term includes a set of search terms, wherein the plurality of embeddings are generated by a first machine-learned model to reflect, for each search-term embedding, characteristics of items belonging to the search term and user preferences, and wherein the plurality of embeddings are generated by the first machine-learned model to have at least ten dimensions;

receiving, from a client device, a request to view a user interface, the user interface configured to receive a search query for the query engine;

retrieving historical activity data including previous search terms entered by a user of the client device in an online concierge system;

identifying a set of candidate categorical search terms corresponding to the previous search terms in the historical activity data according to the hierarchical taxonomy maintained by the embedding database;

receiving, via the user interface, a list of items selected by the user through the query engine; and generating, by the query engine, one or more suggestions of categorical search terms to be displayed at the user interface, wherein generating the one or more suggestions comprises:

mapping the list of items selected by the user to a list of current search terms;

retrieving the search-term embeddings representing the current search terms;

retrieving the categorical-search-term embeddings representing the candidate categorical search terms identified from the previous search terms in the historical activity data;

inputting the search-term embeddings and the categorical-search-term embeddings to a second machine-learned scoring model to generate a score for each candidate categorical search term, the second machine-learned scoring model trained to score the categorical-search-term embeddings based on similarities among the search-term embeddings and the categorical-search-term embeddings in the latent space;

selecting one or more candidate categorical search terms as the one or more suggestions of categorical search terms to be displayed at the user interface; and sending, for display via the client device, one or more suggestions of categorical search terms as dynamic suggestions by the query engine.

18. The computer system of claim 17, the actions further comprising:

retrieving, for each previous search term in the historical activity data, an previous-search-term embedding describing the previous search term, wherein the previous-search-term embedding representing the previous search term in the latent space; and wherein generating the one or more suggestions is further based on the previous-search-term embeddings.

19. The computer system of claim 18, wherein the actions for generating the one or more suggestions further comprise:

determining a ranked list of candidate categorical search terms based on the score for each candidate categorical search term; and selecting a set of the highest ranked candidate categorical search terms in the ranked list.

20. The computer system of claim 17, wherein the actions further comprising:

receiving, from the second machine-learned scoring model, the score for each candidate categorical search term.

\* \* \* \* \*